United States Patent [19]
Chen

[11] Patent Number: 5,818,332
[45] Date of Patent: Oct. 6, 1998

[54] AUTOMOBILE SPEED INDICATOR

[76] Inventor: Yau Dang Chen, 1079 Lancer Dr., San Jose, Calif. 95129

[21] Appl. No.: 493,562

[22] Filed: Jun. 22, 1995

[51] Int. Cl.[6] .................................................... B60Q 1/00
[52] U.S. Cl. ......................... 340/441; 340/464; 340/479; 362/242
[58] Field of Search ........................... 340/441, 464, 340/466, 468, 467, 479, 463, 461; 362/242

[56] References Cited

U.S. PATENT DOCUMENTS

| | | | |
|---|---|---|---|
| 3,320,586 | 5/1967 | Wagner | 340/464 |
| 3,550,076 | 12/1970 | Kent | 340/466 |
| 3,774,152 | 11/1973 | Tandy | 340/464 |
| 4,223,297 | 9/1980 | Nomura et al. | 340/441 |
| 4,272,800 | 6/1981 | Asatourian | 340/464 |
| 4,734,675 | 3/1988 | Wen | 340/479 |
| 4,970,493 | 11/1990 | Yim | 340/468 |
| 5,164,701 | 11/1992 | Nan-Mu et al. | 340/464 |
| 5,272,464 | 12/1993 | Jorgensen | 340/461 |

*Primary Examiner*—Jeffery Hofsass
*Assistant Examiner*—Davetta Woods

[57] ABSTRACT

An automobile speed indicator to be mounted to an automobile includes a speed sensor for generating a speed signal of the automobile to be transmitted to a microprocessor based controller for determination of the speed range of the automobile by being compared with pre-set reference. A lamp unit is electrically connected to the controller to be activated thereby for emitting light signals of different colors to indicate different speed ranges of the automobile.

2 Claims, 5 Drawing Sheets

AUTOMOBILE SPEED INDICATOR

FIELD OF THE INVENTION

The invention relates generally to an automobile speed indicator which emits light signals of different colors to indicate the speed range of the automobile.

BACKGROUND OF THE INVENTION

It is known that the moving speed of a car is mainly dependent upon the road and traffic conditions and for most of the time, it is not possible for a car to travel with a substantially constant speed, except that there are only very few cars running on a wide road or a high way. In driving a car following a leading car at a sufficient distance, a driver can easily know and determine the intention of the leading car driver so as to take necessary action to avoid accident. However, when two cars are initially quite distant away from each other, it is sometimes difficult for the driver of the following car to get aware of the situation of the leading car, for example the deceleration of the leading car, especially when the deceleration of the leading car is done by release the acceleration pedal, rather than activating the deceleration pedal. Under such a situation, it may be dangerous for the driver of the following car for he or she may not have enough time to respond when he or she finally get aware of the deceleration of the leading car. It is particularly true when both cars are travelling along a straight road with high speeds.

Further, when there is a great distance between a leading car and a following car, the driver of the following car may not immediately activate the deceleration pedal when the brake light of the leading car goes on, indicating the leading car is being decelerated. If the driver of the leading car only intends to slightly reduce the speed, then the following car driver's neglect of the deceleration of the leading car causes no risk at all. However, if the driver of the leading car is trying to stop the car or to park, then a hard situation occurs that when the following car is moving in a high speed close to the leading car, a collision may happen, especially in a dark environment. The actuation of the brake light of the leading car is sometimes confuses the following car driver if the leading car is to stop or just slightly reduces the speed. Under such a situation, incorrect decision may be made by the following car driver.

Thus, it is desirable to provide an automobile speed indicator which provides signals to indicate the travelling speed range of a car so as to allow the following car driver to make a correct judgement of the speed of the leading car.

SUMMARY OF THE INVENTION

An object of the present invention is to provide an automobile speed indicator which generates light signals of different colors to indicate different speed ranges of a moving automobile.

According to the present invention, an automobile speed indicator comprises a speed sensor associated with a microprocessor based controller to provide a speed signal corresponding to the speed of a moving car to the controller. The controller compares the speed signal with pre-determined reference and generates a comparison signal to indicate the comparison result which may represent the range into which the speed of the automobile falls. A lamp unit in electrical connection with the controller is activated to emit a light signal of a specific color corresponding to the speed range in response to the comparison signal.

An example of the speed ranges is a low speed range from 0 to 25 km/h, a middle speed range from 25 km/h to 55 km/h and a high speed range for speed faster than 55 km/h. The lamp unit emits blue light for the low speed range and yellow light for the middle speed range and turns off for the high speed range. If a car is accelerated from zero speed, then the lamp unit emits blue light first, then yellow light and then both lights go off. In deceleration, the process goes in a reversed manner.

In accordance with the present invention, the speed indicator is made independent of the original brake light system of an automobile so that the brake light and the speed indicate may be actuated at the same time.

In accordance with a further aspect of the present invention, buffering zone is provided between the low, middle and high speed ranges which allows the speed indicating lights to be switched at a sightly higher speed than, for example 25 km/h and 55 km/h, when the car is being accelerated and allows the speed indicating lights to be switched at a sightly lower speed than, for example 25 km/h and 55 km/h, when the car is being decelerated. This allows the speed indication system to be working in a more stable manner.

BRIEF DESCRIPTION OF THE DRAWINGS

Other features and advantages of the present invention will become apparent in the following detailed description of a preferred embodiment of the invention, with reference to the attached drawings, wherein.

DETAILED DESCRIPTION OF THE PREFERRED EMBODIMENT

Figure 1:
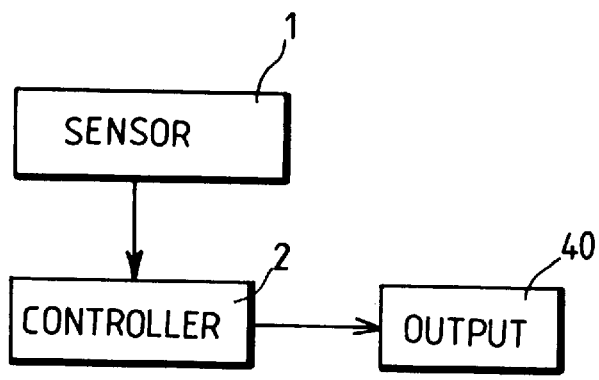
FIG. 1 is a block diagram of an automobile speed indicator of the present invention.
Figure 4:
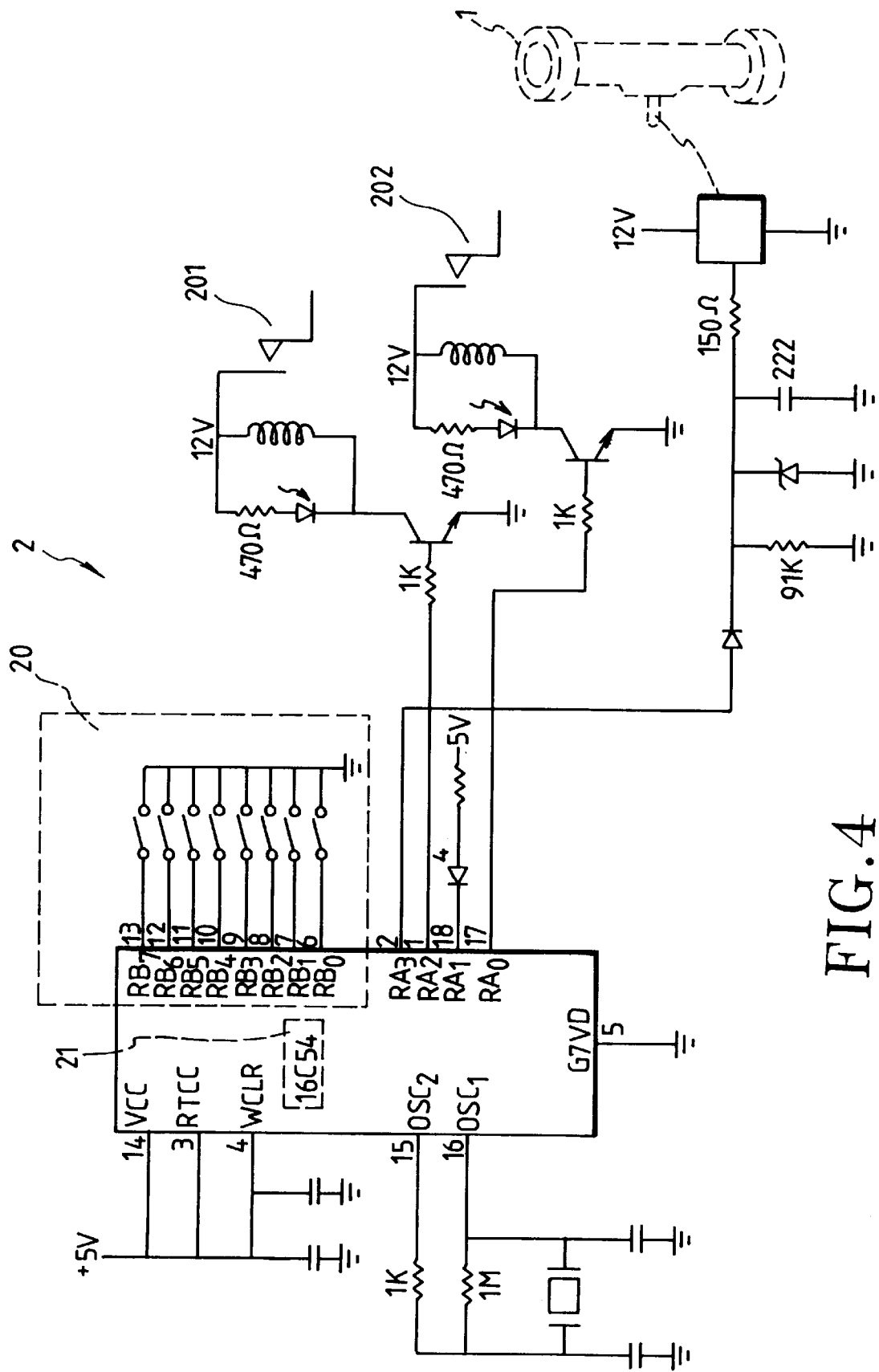
FIG. 4 is a circuit diagram of the automobile speed indicator of the present invention.

With reference to the drawings and in particular to FIG. 1, wherein a block diagram of an automobile speed indicator constructed in accordance with the present invention is shown, the automobile speed indicator of the present invention comprises a speed sensor 1 associated with a wheel of an automobile (not shown) to which the automobile speed indicator is to be mounted. The speed sensor 1 may be any known means that is capable to detect the speed, such as in term of revolutions per unit time, for example RPM, of the wheel and to transmit the detected speed signal to a microprocessor based controller 2, comprising a microprocessor 21, such as 16C54, see FIG. 4, which in turn determines in which of a number of speed ranges the current speed of the wheel falls and selectively actuates one of a number of indicating lights of different colors, in response to the speed signal of the wheel.

Figure 2:
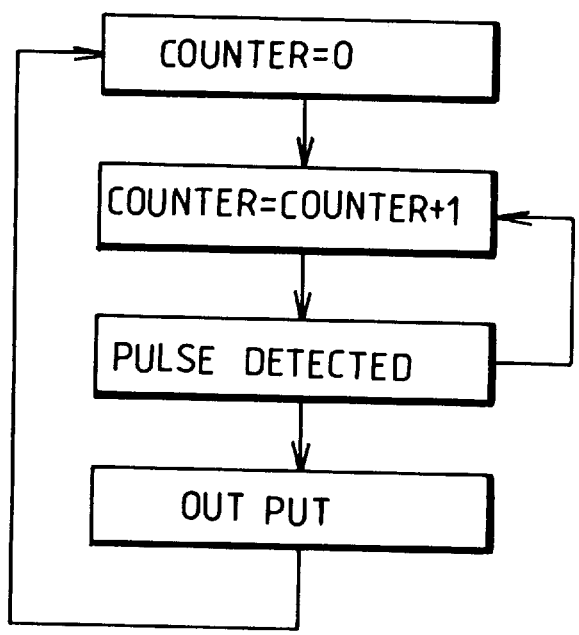
FIG. 2 is a flow chart showing the operation of the microprocessor based controller adapted in the automobile speed indicator of the present invention.

In a preferred embodiment, the speed sensor 1 generates a pulse for each revolution of the wheel so that during the movement of the automobile, the speed sensor 1 generates and sends out a series of pulses to the controller 2. The pulses that are transmitted to the controller 2 are used to determine the speed of the moving automobile. In FIG. 2, a flow chart is shown to illustrate the operation of the microprocessor base controller 2. Initially, a counter is set to zero. Once a pulse is encountered by the controller 2, the counter in increased by one. The number of the pulses indicates the turns that the wheel rotates which when multiplied by the circumference of the tire of the wheel gives the distance that the automobile moves through. A simple operation of division of the distance by the time period of the pulses gives the speed of the automobile.

It is of course possible to use the reading of the odometer to indicate the speed of the automobile.

In FIG. 3, a circuit diagram of the controller 2 is illustrated, wherein speed reference setting means 20 is coupled to the microprocessor 21 of the controller 2. The setting means 20 may comprises a number of setting pins, such as DIP, to allow a user to set the desired reference value.

The moving speed of the automobile that is detected by the speed sensor 1 and determined by the microprocessor 21 is compared with the references set by the setting means 20 to generate a comparison signal which decides in which one of a number of speed ranges that the moving speed of the automobile falls. In the embodiment illustrated, there are three speed ranges, namely a low speed range between 0 to 25 km/h, a middle speed range between 25 km/h to 55 km/h and a high sped range greater than 55 km/h.

Figure 5:
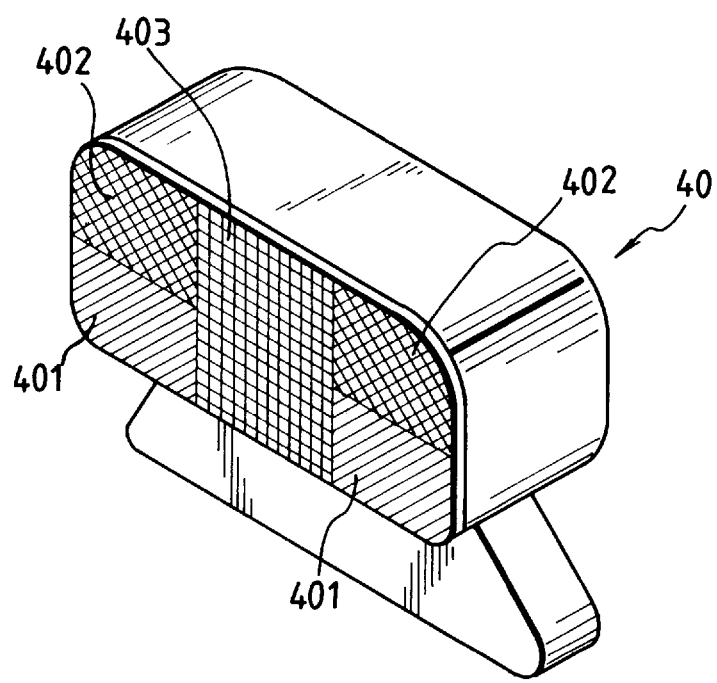
FIG. 5 is a perspective view speed a lamp unit of the present invention integrated with a third brake light of an automobile.

The automobile speed indicator of the present invention further comprises indicating light means, such as lamp unit 40 (FIG. 5), associated with the speed ranges, which, in the embodiment illustrated, comprises a first color light generator 401 associated with the low speed range and a second color light generator 402 associated with the middle speed range, see FIG. 5. In this embodiment, the high speed range has no specific light associated therewith.

In operation, once the controller 2 determines the speed range of the moving automobile, an associated light generator 401 or 402 is actuated to emit light of associated color. In this specific embodiment, the first color is blue and the second color is yellow. In other words, when the automobile is travelling at a speed belonging to the low speed range, the first light generator 401, by being driven by an associated first power source 201 (FIG. 5), emits blue light and when the automobile is travelling at a speed falling within the middle speed range, the second light generator 402 is driven by an associated second power source 202 to emit yellow light. When the automobile is travelling faster than the middle speed range, then no specific light will be emitted by the light generated. Both power sources 201 and 202 are controlled by the controller 2.

Figure 3A:
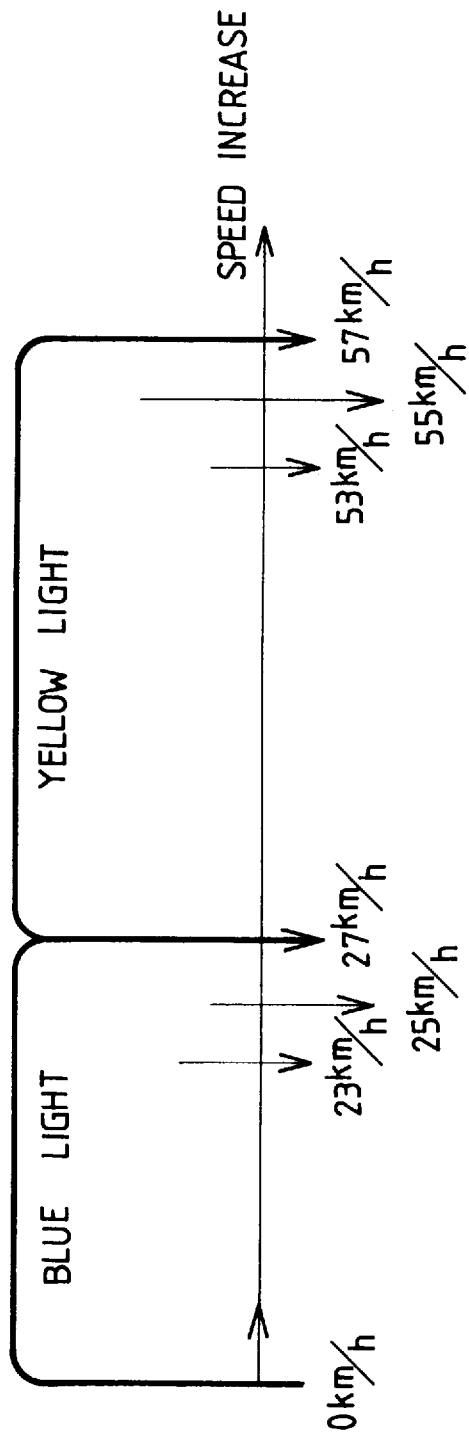
FIGS. 3A and 3B are speed diagrams respectively showing the switching of different color warning signals provided by the present invention during an acceleration cycle and a deceleration cycle.
Figure 3B:
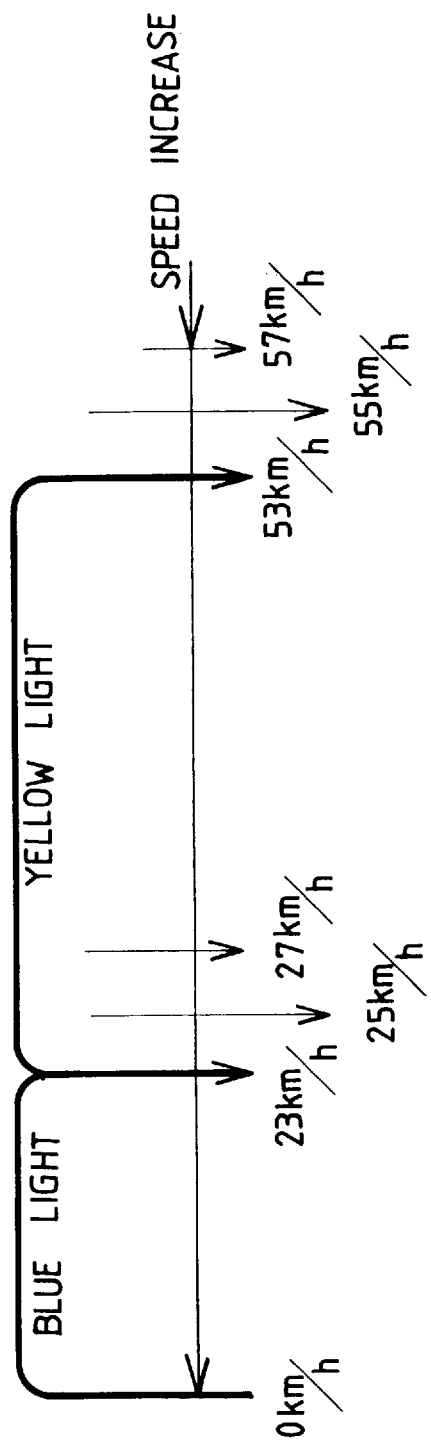

When the automobile is accelerated from zero speed, the blue light goes on first and then when the speed reaches 25 km/h, the blue light goes off and the yellow one on. Once the automobile is accelerated to the speed of 55 km/h, the yellow light goes off too. In deceleration, the process goes in a reversed manner. However, it is preferable to provide a buffering zone in switching the lights. This is illustrated in FIGS. 3A and 3B. In FIG. 3A, an acceleration cycle is illustrated. A 2 km/h buffering zone is set by means of the microprocessor 21 so that when the automobile is accelerated to cross the boundary between the low speed range and the middle speed range, namely 25 km/h, the blue light will not be switched to the yellow light until the speed increased to reach 27 km/h (namely the boundary value 25 km/h plus the buffering zone 2 km/h). This is similar when the speed is to cross the boundary between the middle speed range and the high speed range, namely 55 km/h. In other words, the yellow light will not go off until the speed reaches 57 km/h (55 km/h plus 2 km/h).

In FIG. 3B, a deceleration cycle is illustrated. Similarly, a 2 km/h buffering zone is set by means of the microprocessor 21 so that when the automobile is decelerated to cross the boundary between the high speed range and the middle speed range, namely 55 km/h, the yellow light will not go on until the speed increased to reach 53 km/h (namely the boundary value 55 km/h minus the buffering zone 2 km/h). This is similar when the speed is to cross the boundary between the middle speed range and the low speed range, namely 25 km/h. In other words, the yellow light will not be switched to blue until the speed reaches 23 km/h (25 km/h minus 2 km/h).

In FIG. 5, a perspective view of a indicating light means or lamp assembly for embodying the present invention is shown. The lamp assembly, which is designated with the reference numeral 40, comprises three different color lights, namely a brake light 403 which is red, two blue lights 401 associated with the low speed range and two yellow lights 402 associated with the middle speed range. The two blue lights 401 are respectively disposed on two opposite sides of the brake light 403 and this is the same for the two yellow lights 402. The lamp assembly 40 may be secured on the rear windshield to replace the third brake light of the automobile.

It can be understood from the above description that the automobile speed indicator of the present invention provides several advantages, such as:

(1) The automobile speed indicator of the present invention uses lights of different colors to indicate different speed ranges so as to allow a driver to clearly known the speed of a car moving in front of his or her car and thus a correct action may be taken to avoid any potential accident.

(2) Since the automobile speed indicator of the present invention is independent of the original brake light system of a car, it is possible for the brake light and the speed indicating lights to turn on at the same time. This provides a best indication of the speed change (fast deceleration or slow deceleration) of the leading car to the drivers of following cars.

It is apparent that although the invention has been described in connection with the preferred embodiments, it is contemplated that those skilled in the art may make changes to the preferred embodiments without departing from the scope of the invention as defined in the appended claims.

What is claimed is:

1. An automobile speed indicator system, comprising:

a speed sensor which generates a speed signal corresponding to speed of an automobile;

a microprocessor based controller which is in electrical connection with the speed sensor to receive the speed signal for obtaining a value indicating the speed of the automobile and to compare the value to a pre-determined reference to provide a first comparison signal when the speed is within a pre-determined first speed range; and a first lamp unit in electrical connection with the controller and activateable to emit a first light signal in response to the first comparison signal;

the controller providing a second comparison signal when the speed is within a second speed range which is higher than the first speed range, the automobile speed indicator further comprising a second lamp unit in electrical connection with the controller to be activateable to emit a second light signal in response to the second comparison signal from the controller;

the first light signal having a first color and the second light signal having a second color that is different from the first color;

the controller further providing a third comparison signal when the speed is over the second speed range wherein under that situation, no light signal will be emitted; and a lamp assembly being provided to replace a conventional third brake light of the automobile on a rear windshield thereof, and comprising three different color lights wherein a first color light is the first lamp unit to generate the first color, a second color light is the second lamp unit to generate the second color, and a conventional brake light, and wherein said automobile speed indicator is independent of a original brake light system connected to said brake light, so that it is possible for the brake light and one of the first and the second color lights to turn on at the same time, thus providing a best indication of speed change, i.e., fast deceleration or slow deceleration of a leading car to a driver of following cars, and additionally, when the speed is over the second speed range, only the regular brake light will be emitted during deceleration.

2. An automobile speed indicator, comprising:

a speed sensor which generates a speed signal corresponding to speed of an automobile;

a microprocessor based controller which is in electrical connection with the speed sensor to receive the speed signal for obtaining a value indicating the speed of the automobile and to compare the value to a pre-determined reference to provide a first comparison signal when the speed is within a pre-determined first speed range; and a first lamp unit in electrical connection with the controller and activateable to emit a first light signal in response to the first comparison signal;

the controller providing a second comparison signal when the speed is within a second speed range, the automobile speed indicator further comprising a second lamp unit in electrical connection with the controller to be activateable to emit a second light signal in response to the second comparison signal from the controller;

the first light signal having a first color and the second light signal having a second color that is different from the first color; wherein a buffering zone is provided between the first speed range and the second speed range so that it is allowed to have the first lamp unit and the second lamp unit switched at a slightly higher speed than a pre-determined value when the automobile is being accelerated, and at a slightly lower speed than said predetermined value when the automobile is being decelerated, thus assuring said indicator to be working in a more stable manner.

* * * * *